(12) United States Patent
Urech

(10) Patent No.: US 11,970,913 B2
(45) Date of Patent: *Apr. 30, 2024

(54) OIL COUNTRY TUBULAR GOODS CASING COUPLING

(71) Applicant: OCTG Connections, LLC, Addison, TX (US)

(72) Inventor: Bowman A. Urech, Plano, TX (US)

(73) Assignee: OCTG CONNECTIONS, LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,916

(22) Filed: May 8, 2023

(65) Prior Publication Data

US 2023/0279730 A1    Sep. 7, 2023

Related U.S. Application Data

(63) Continuation of application No. 17/233,888, filed on Apr. 19, 2021, now Pat. No. 11,680,451, which is a continuation of application No. 16/168,058, filed on Oct. 23, 2018, now Pat. No. 11,008,819.

(60) Provisional application No. 62/578,941, filed on Oct. 30, 2017.

(51) Int. Cl.
| | |
|---|---|
| F16L 15/00 | (2006.01) |
| E21B 17/042 | (2006.01) |
| E21B 17/08 | (2006.01) |
| E21B 23/00 | (2006.01) |
| F16L 15/06 | (2006.01) |

(52) U.S. Cl.
CPC ............ *E21B 17/08* (2013.01); *E21B 17/042* (2013.01); *E21B 23/00* (2013.01); *F16L 15/00* (2013.01); *F16L 15/001* (2013.01); *F16L 15/06* (2013.01)

(58) Field of Classification Search
CPC ........ F16L 15/001; F16L 15/006; F16L 15/06
See application file for complete search history.

(56) References Cited

U.S. PATENT DOCUMENTS

| | | |
|---|---|---|
| 1,281,977 A | 10/1918 | Kelley |
| 1,901,286 A | 3/1933 | Coe |
| 2,992,613 A | 7/1961 | Bodine |
| 3,083,043 A | 3/1963 | Thornhill |
| 3,572,771 A | 3/1971 | Redwine |
| 3,574,373 A | 4/1971 | Derf et al. |
| 3,850,535 A | 11/1974 | Howlett et al. |

(Continued)

FOREIGN PATENT DOCUMENTS

| | | |
|---|---|---|
| CN | 1289018 A | 3/2001 |
| CN | 201756920 U | 3/2011 |
| WO | 2017024208 A1 | 2/2017 |

OTHER PUBLICATIONS

U.S. Pat. No. 263943, Dated September 5, 1882.

(Continued)

*Primary Examiner* — Aaron M Dunwoody
(74) *Attorney, Agent, or Firm* — Husch Blackwell LLP

(57) ABSTRACT

A threaded coupling comprising a first end, a second end, a first portion of the threaded coupling defining a first thread profile, a second portion of the threaded coupling defining a second thread profile different from the first thread profile, where at least two threads of the second thread profile proximate to the second end are reduced in height according to an extra machining angle.

18 Claims, 2 Drawing Sheets

(56) References Cited

U.S. PATENT DOCUMENTS

| | | | |
|---|---|---|---|
| 4,121,862 A * | 10/1978 | Greer | F16L 15/001 |
| | | | 285/333 |
| 4,373,750 A | 2/1983 | Mantelle et al. | |
| 4,494,777 A | 1/1985 | Duret | |
| 4,508,375 A * | 4/1985 | Patterson | F16L 15/001 |
| | | | 285/390 |
| 4,676,563 A | 6/1987 | Curlett et al. | |
| 4,683,944 A | 8/1987 | Curlett | |
| 4,762,344 A | 8/1988 | Perkins et al. | |
| 4,892,337 A | 1/1990 | Gunderson et al. | |
| 5,505,502 A | 4/1996 | Smith et al. | |
| 5,769,466 A | 6/1998 | Noel et al. | |
| 5,906,399 A | 5/1999 | Noel | |
| 6,045,165 A | 4/2000 | Sugino et al. | |
| 6,174,000 B1 * | 1/2001 | Nishi | E21B 17/042 |
| | | | 285/333 |
| 6,406,070 B1 | 6/2002 | Delange et al. | |
| 6,817,633 B2 | 11/2004 | Brill et al. | |
| 6,908,121 B2 | 6/2005 | Hirth et al. | |
| 6,991,268 B2 | 1/2006 | Spears | |
| 7,017,951 B2 | 3/2006 | Spears | |
| 7,390,032 B2 | 6/2008 | Hughes | |
| 7,438,329 B2 | 10/2008 | Delange et al. | |
| 7,963,572 B2 | 6/2011 | Bull et al. | |
| 8,038,179 B2 | 10/2011 | Takano et al. | |
| 8,075,023 B2 | 12/2011 | Geary et al. | |
| 8,628,120 B1 | 1/2014 | Clark et al. | |
| 8,840,152 B2 | 9/2014 | Carcagno et al. | |
| 8,998,270 B2 | 4/2015 | Wolff | |
| 9,004,544 B2 | 4/2015 | Carcagno et al. | |
| 9,261,207 B1 | 2/2016 | Nations, Jr. et al. | |
| 9,261,208 B1 * | 2/2016 | Nations, Jr. | E21B 17/042 |
| 9,303,466 B2 | 4/2016 | Makelki et al. | |
| 9,617,799 B2 | 4/2017 | Fraignac et al. | |
| 2003/0025327 A1 | 2/2003 | Mannella | |
| 2004/0118569 A1 | 6/2004 | Brill et al. | |
| 2004/0251686 A1 * | 12/2004 | Otten | F16L 15/001 |
| | | | 285/333 |
| 2006/0152000 A1 * | 7/2006 | DeLange | E21B 17/042 |
| | | | 285/333 |
| 2011/0025051 A1 * | 2/2011 | Yamaguchi | E21B 17/042 |
| | | | 285/333 |
| 2012/0032435 A1 | 2/2012 | Carcagno et al. | |
| 2012/0235406 A1 * | 9/2012 | Sugino | F16L 15/001 |
| | | | 285/390 |
| 2014/0035280 A1 | 2/2014 | Shand | |
| 2014/0054891 A1 | 2/2014 | Ames et al. | |
| 2016/0123508 A1 | 5/2016 | Tejeda et al. | |
| 2016/0123509 A1 * | 5/2016 | Tejeda | E21B 17/042 |
| | | | 285/70 |
| 2016/0130885 A1 | 5/2016 | Liu et al. | |
| 2016/0334033 A1 * | 11/2016 | Yoshikawa | F16L 15/06 |
| 2016/0376851 A1 * | 12/2016 | Morrow | F16L 15/001 |
| | | | 403/342 |
| 2017/0122468 A1 * | 5/2017 | Sugino | E21B 17/042 |
| 2017/0159853 A1 | 6/2017 | Lane | |
| 2017/0167642 A1 * | 6/2017 | Williamson | E21B 17/042 |
| 2017/0198840 A1 | 7/2017 | Gabdullin | |
| 2017/0254156 A1 * | 9/2017 | Aguilar Mendez | E21B 17/042 |
| 2017/0307114 A1 * | 10/2017 | Suzuki | E21B 17/042 |

OTHER PUBLICATIONS

Chinese Office Action Issued for Chinese Patent Application No. 202110409083.X, Dated Nov. 16, 2023, 7 pages.
Chinese Office Action Issued for Chinese Patent Application No. 201811266037.3, Dated Jan. 17, 2020, 7 pages.
Chinese Office Action Issued for Chinese Patent Application No. 202110409083.X, Dated Oct. 13, 2022, 7 pages.
Chinese Office Action Issued for Chinese Patent Application No. 202110409083.X, Dated Jul. 7, 2023, 9 pages.
Canadian Office Action Issued for Canadian Patent Application No. 3022099, Dated May 25, 2021, 9 pages.

* cited by examiner

OIL COUNTRY TUBULAR GOODS CASING COUPLING

CROSS REFERENCE TO RELATED APPLICATIONS

This application is a continuation of U.S. patent application Ser. No. 17/233,888, filed on Apr. 19, 2021, which is a continuation of U.S. patent application Ser. No. 16/168,058, filed on Oct. 23, 2018, which claims priority to U.S. Provisional Patent Application No. 62/578,941, filed on Oct. 30, 2017; the contents of all applications are hereby incorporated by reference in their entirety.

FIELD

The present invention relates to apparatuses and methods related to a casing coupling which may be used in drilling oil and gas wells.

BACKGROUND

Oil and gas wells and other types of wells, such as geothermal wells, are typically drilled from the well surface to a desired downhole location using a rotary drilling rig, drill pipe, and drill bits. Casing is used as a structural retainer and conduit in those wells.

Wellbores for producing oil, gas, or other formation fluids are typically drilled in stages. For example, a wellbore may be first drilled with a drill string and a first drill bit having a particular diameter. At a desired depth for a first portion of the wellbore, the drill string and drill bit are removed from the wellbore. Tubular members of a smaller diameter, often referred to as casing or a casing string, may then be placed in the first portion of the wellbore. An annulus formed between the inside diameter of the wellbore and the outside diameter of the casing string is generally filled with cement. The cement provides support for the casing and isolates downhole formations or subterranean strata from each other.

Often, the next step in drilling the wellbore is to pass the drill string with a second, smaller diameter drill bit through the first casing string and drill another portion of the wellbore to a selected depth beyond the depth of the first casing string. This sequence of drilling wellbores and installing casing strings may be repeated as many times as necessary, with smaller and smaller components until the ultimate desired depth or downhole location of the wellbore has been achieved.

Most wells in North America are also drilled horizontally and later completed—hydraulically fractured—through the casing. Horizontal wells may require the casing to be rotated, to reduce pipe-wellbore friction and to prevent the casing string from buckling and sticking due to friction induced compression loads, thereby allowing the string to be run to its total depth. Rotation results in casing string torque. Hydraulic fracturing can place high internal pressure and tension loads—resulting from ballooning and thermal effects in addition to string weight—on casing strings.

Wells may require thousands of feet of casing. For example, a wellbore may be drilled to a depth of 10,000 feet and further drilled horizontally another 10,000 feet, if hydraulic fracturing completions are implemented. As such, multiple pipe segments are connected together to form the casing string, and the pipe segments are connected through threaded couplings. Many of the specifications of couplings ("boxes") and pipe segments ("joints") are standardized by the American Petroleum Institute ("API"). Casing connections comprised of API couplings have low torque capacity relative to the pipe.

Oilfield couplings must meet strength specifications in order to maintain the mechanical integrity of the casing string. The strength of the couplings is particularly tested greatest whenever the casing string is used for hydraulic fracturing completions. Most casing string failures occur in connections. As such, there is a need within the art for strong and reliable couplings that can be manufactured economically.

BRIEF SUMMARY

The disclosed embodiments relate to a threaded coupling comprising a first end, a second end, a first portion of the threaded coupling defining a first thread profile, a second portion of the threaded coupling defining a second thread profile different from the first thread profile, where at least the first two threads of the second thread profile proximate to the second end are reduced in height according to an extra machining angle.

DETAILED DESCRIPTION

Preferred embodiments of the invention and its advantages are best understood by reference to FIGS. 1-7 wherein like numbers refer to same and like parts.

The term "oil country tubular goods" and "OCTG" are used in this application to include casing, tubing, pup joints, couplings, and any other type of pipe or tubular members associated with drilling, producing, or servicing oil wells, natural gas wells, geothermal wells or any other subsurface wellbore.

A variety of oil country tubular goods (OCTG) and widely used casing accessories may be engaged with each other by threaded connections formed in accordance with the teachings of the present invention. For some applications, tubular members may be sections of a casing string used to both drill and complete a wellbore (not expressly shown).

Figure 1:
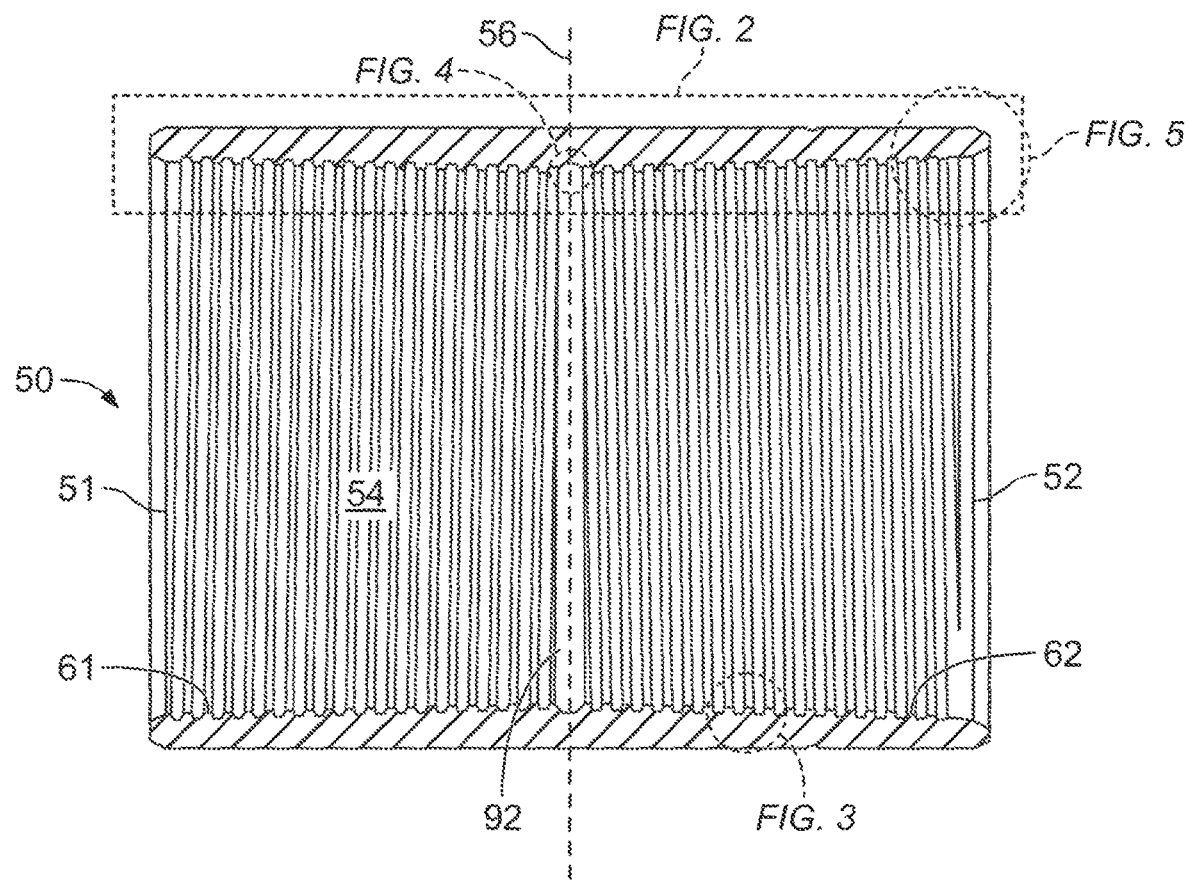
FIG. 1 is a schematic drawing of a cross-section of a coupling according to an exemplary embodiment.

Referring to FIG. 1, a coupling 50 may have a shorter length, the same outside diameter, and most thread element dimensions and configuration associated with standard API couplings for oil country tubular goods. The coupling 50 may be described as a relatively short section of tube that can be defined in part by a first end 51 and a second end 52 with a longitudinal bore 54 extending there between.

According to an exemplary embodiment, the coupling 50 can include a first internal thread profile 61 and a second internal thread profile 62 formed within the longitudinal bore 54 extending respectively from the first end 51 and the second end 52. In some embodiments, the first internal thread profile 61 and a second internal thread profile 62 can be mirrored. Center plane or midsection 56 can define approximately a middle of the coupling 50 defining a relief groove 92. For some applications, the first and second internal thread profiles 61 and 62 may comprise buttress threads for OCTG.

Referring still to FIG. 1, the first internal thread profile 61 (field side) may have a different pitch diameter than a pitch diameter of the second internal thread profile 62 (mill side). Therefore, the coupling 50 may include a first pitch diameter and a second pitch diameter. The pitch diameter of the second internal thread profile 62 may be smaller than the pitch diameter of the first internal thread profile 61, the purpose of which is to ensure that the mill side has higher make-up torque. Said differently, a crest diameter of the second internal thread profile 62 may be smaller than a crest diameter of the first internal thread profile 61.

Figure 2:
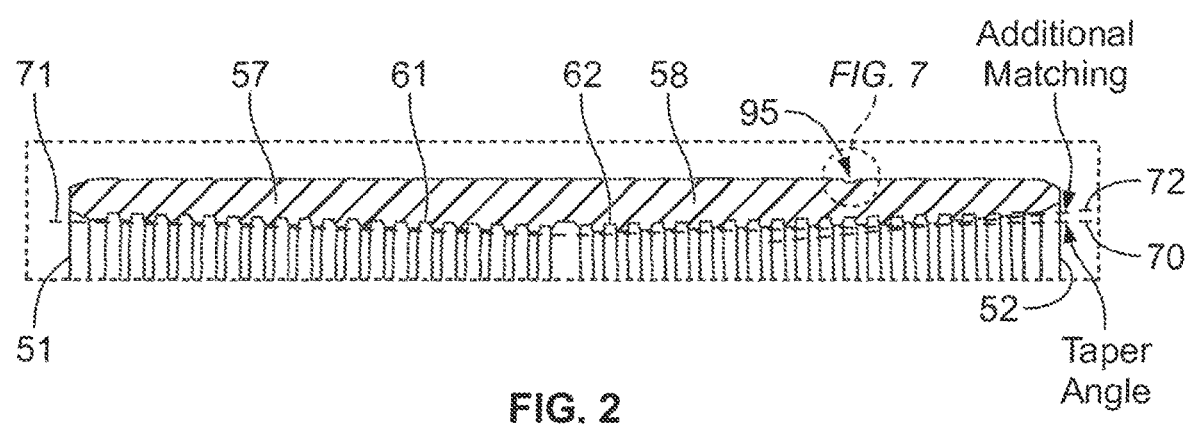
FIG. 2 illustrates a schematic drawing of a top portion of the cross-section of the coupling according to an exemplary embodiment.

FIG. 2 illustrates that a first portion 57 of the coupling 50 closer to the first end 51 may have a first taper 71, and a second portion 58 of the coupling 50 closer to the second end 52 may have a second taper 70. According to an exemplary embodiment, the taper 71 of the first portion 57 and the taper 70 of the second portion 58 can have the same or a similar taper angle. Thus, the taper 71 of the first portion 57 can be the same as the taper 70 of the second portion 58. In the embodiments where the taper 71 of the first portion 57 is the same as the taper 70 of the second portion 58, the taper 71 of the first portion 57 can pass through different points than the taper 70 of the second portion 58 because the pitch diameter of the threads 62 associated with the second portion 58 can have a smaller crest diameter than the threads 61 associated with the first portion 57.

Respective internal thread profiles 61 and 62 may be formed on first portion 57 and second portion 58 using threading machines and equipment (not expressly shown). In addition, the coupling 50 may engage with one or more pins.

Figure 6:
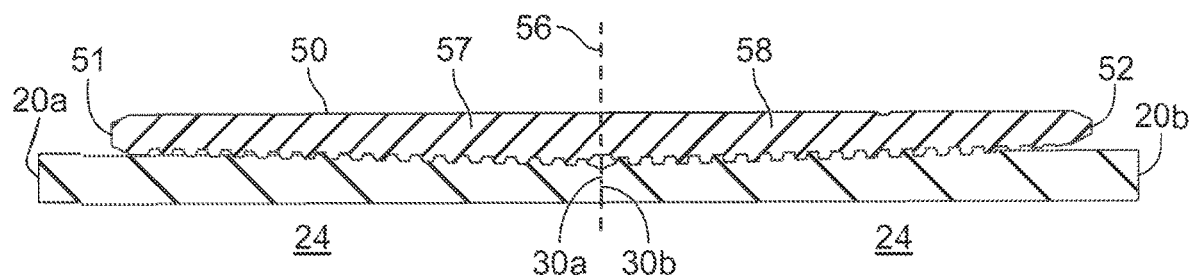
FIG. 6 illustrates a schematic drawing of a coupling connecting to tubular pins according to an exemplary embodiment.

Various types of powered tools and equipment (not expressly shown) may be used to engage coupling 50 with a first pin 20a (FIG. 6). In a similar manner, the coupling 50 may engage with a second pin 20b. The first pin 20a may engage the coupling 50 by engaging the threads of the first portion 57, and the second pin 20b may engage the coupling 50 by engaging the threads of the second portion 58 (See: FIG. 6). The first pin 20a may engage the first internal thread profile 61 having the first pitch diameter, and the second pin 20b may engage the second internal thread profile 62 having the second pitch diameter. According to an exemplary embodiment, the first pin 20a and the second pin 20b may be substantially similar in design and construction. The second pin 20b may engage the coupling 50 at a factory during manufacture (the mill pin), which may engage the second portion 58 (mill side) of the coupling 50; the first pin 20a may engage the coupling 50 at the wellsite (the field pin), which may engage the first portion 57 (field side) of the coupling 50.

FIG. 6 shows the first and second pin 20a, 20b as generally having an elongated, hollow section of casing with a longitudinal bore 24. The first and second pins 20a, 20b may also include thread profiles. The respective thread profiles of the pins 20a, 20b may have the same or similar pitch diameters.

Extreme end 30a of the first pin 20a (i.e. "field end") and extreme end 30b of the second pin 20b (i.e. "mill end") may be in direct contact with each other at the midsection 56 of the coupling 50. This contact between the extreme ends 30a and 30b can create adjoining or abutting radial torque shoulders located proximate to the midsection 56 of coupling 50. Direct contact between extreme ends 30a and 30b can ensure that axial compressive loads and most torsional loads exerted during casing string running and rotation will be transmitted against adjacent tubular members 20a and 20b rather than the adjacent thread flanks of the coupling 50. In this way, the coupling 50 may not include a shoulder or ring between the first and second pins 20a, 20b.

Figure 7:
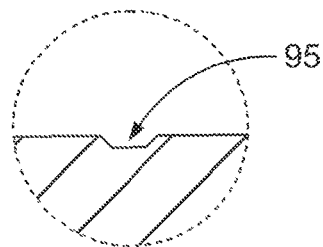
FIG. 7 illustrates a permanent marking indicating a second end (mill side) of the coupling according to an exemplary embodiment.

In some embodiments, the coupling 50 can include a groove, symbol, or other permanent marking 95 externally located only on the mill end (second section 58) of the coupling 50 (See FIGS. 2, 6, and 7). Because of the different pitch diameters, the coupling 50 should indicate which end 51, 52 is the mill end. The groove, symbol, or other permanent marking 95 can be etched or machined into the mill end of the coupling 50 during manufacturing.

Referring again to FIG. 2, the coupling 50 may comprise J55, K55, N80, L80, C90, R95, T95, P110 or C110 coupling stock. When P110 coupling stock is used, the P110 coupling stock can have a lessened tensile strength than standardized P110 tensile strength. The tensile strength of the coupling stock may be lessened through a heat treatment.

As shown in FIG. 2, the second portion 58 may include a taper angle 70 and an extra machining angle 72. In some embodiments, the first portion 57 may similarly include a taper angle 71 and an extra machining angle, but the preferred embodiment performs the extra machining angle 72 only on the mill end. In some embodiments, the extra machining angle 72 may be different than the taper angle 70 of the second portion 58.

Figure 5:
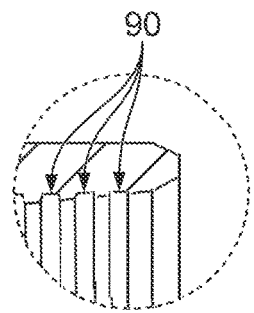
FIG. 5 illustrates a schematic drawing of an end portion of the coupling with a machining angle according to an exemplary embodiment.

The pitch diameters 62 and 61 can decrease according to the taper angle 70 from the first or second end 51 or 52 toward the midsection 56. According to an exemplary embodiment, the extra machining angle 72 may affect the first 3-5 threads of the thread profile 61 or 62. The extra machining angle 72 may be performed at an angle approximately 1-5° higher than the taper angle 70. For example, if the taper angle 70 is 5°, then the extra machining angle 72 can be 10°. As shown in FIG. 5, the extra machining angle 72 causes the height of the threads 90 closest to the ends 51, 52 to be shortened according to the extra machining angle 72. The crests of the threads 90 closest to the ends 51, 52 are also angled according to the extra machining angle 72, but the roots of the threads 90 closest to the ends 51, 52 are cut at the taper angle 70, 71. The number of threads machined at the extra machining angle 72 can be the 2-5 threads closest to the ends 51, 52. The extra machining angle 72 may be generated by causing another machining pass before forming the pitch diameters 61, 62.

The effect of the extra machining angle 72 reduces stress on the last thread of the coupling 50, which is usually the thread that receives the most stress. Reducing the stress on the last thread reduces the chances of failure within the coupling 50.

Figure 3:
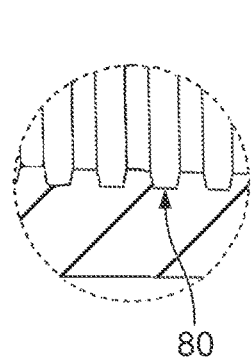
FIG. 3 illustrates a schematic drawing of a buttress thread shape of the coupling according to an exemplary embodiment.

Referring to FIG. 3, a close-up of the buttress thread profile 80 is illustrated. As shown, each buttress thread may include a stabbing flank and a load flank. The stabbing flank may be closer to the midsection 56 than the load flank. The load flank of the thread shape 80 can carry the load of a casing string.

Figure 4:
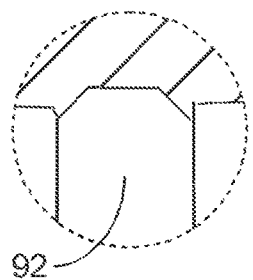
FIG. 4 illustrates a schematic drawing of a relief groove located at a midsection of the coupling according to an exemplary embodiment.

FIG. 4 illustrates the relief groove 92. In some embodiments, the relief grove 92 creates a reservoir for trapped thread compounds and can allow for economy by eliminating the need for a perfect land of threads during manufacturing.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A threaded coupling comprising:
    a field end;
    a mill end;
    a longitudinal bore extending through the threaded coupling;
    a field-side portion of the threaded coupling defining a first thread profile including a pitch and a first crest diameter; and
    a mill-side portion of the threaded coupling defining a second thread profile including the pitch and a second crest diameter,
    wherein the pitch of the first thread profile being the same as the pitch of the second thread profile, and the second crest diameter of the second thread profile being smaller than the first crest diameter of the first thread profile.

2. The threaded coupling of claim 1, wherein at least two threads of the second thread profile proximate to the mill end are reduced in height according to an extra machining angle.

3. The threaded coupling of claim 1, wherein the first thread profile comprises a first taper angle.

4. The threaded coupling of claim 3, wherein the second thread profile comprises a second taper angle, and wherein the second taper angle is substantially the same as the first taper angle.

5. The threaded coupling of claim 1, further comprising a relief groove formed at a midsection of the threaded coupling.

6. The threaded coupling of claim 1, further comprising:
    a first pin engaged to the first thread profile; and
    a second pin engaged to the second thread profile.

7. The threaded coupling of claim 6, wherein a first end of the first pin is in direct contact with a first end of the second pin at approximately a midsection of the threaded coupling.

8. The threaded coupling of claim 1, wherein the extra machining angle is larger than a taper angle of the second thread profile.

9. The threaded coupling of claim 1, further comprising a permanent marking indicating the mill end formed on an exterior of the threaded coupling.

10. A system comprising:
    a threaded coupling comprising:
        a field end
        a mill end;
        a longitudinal bore extending through the threaded coupling;
        a field-side portion of the threaded coupling defining a first thread profile including a pitch and a first crest diameter; and
        a mill-side portion of the threaded coupling defining a second thread profile including the pitch and a second crest diameter,
    wherein the pitch of the first thread profile being the same as the pitch of the second thread profile, and the second crest diameter of the second thread profile being smaller than the first crest diameter of the first thread profile; and
    a first pin engaged to the first thread profile; and
    a second pin engaged to the second thread profile.

11. The system of claim 10, wherein at least two threads of the second thread profile proximate to the mill end are reduced in height according to an extra machining angle.

12. The system of claim 10, wherein the first thread profile comprises a first taper angle, wherein the second thread profile comprises a second taper angle, and wherein the second taper angle is substantially the same as the first taper angle.

13. The system of claim 10, further comprising a relief groove formed at a midsection of the threaded coupling.

14. The system of claim 10, wherein the field-side portion extends between the field end and a midsection of the coupling, and wherein the mill-side portion extends between the mill end and the midsection of the coupling.

15. The system of claim 10, further comprising a permanent marking externally etched on the mill end of the threaded coupling.

16. A method for manufacturing a threaded coupling comprising:
    forming a first thread profile including a pitch and a first crest diameter on a field-side portion of the threaded coupling; and
    forming a second thread profile including the pitch and a second crest diameter on a mill-side portion of the threaded coupling,
    wherein the pitch of the first thread profile being the same as the pitch of the second thread profile, and the second crest diameter of the second thread profile being smaller than the first crest diameter of the first thread profile.

17. The method of claim 16, further comprising reducing in height at least two threads of the second thread profile proximate to a mill end of the threaded coupling according to an extra machining angle.

18. The method of claim 17, wherein the extra machining angle is higher than an angle defining the second thread profile.

* * * * *